Feb. 26, 1957
F. E. CREVER
2,783,391
LOAD DIVISION CONTROL FOR PRIME MOVERS
Filed May 3, 1955
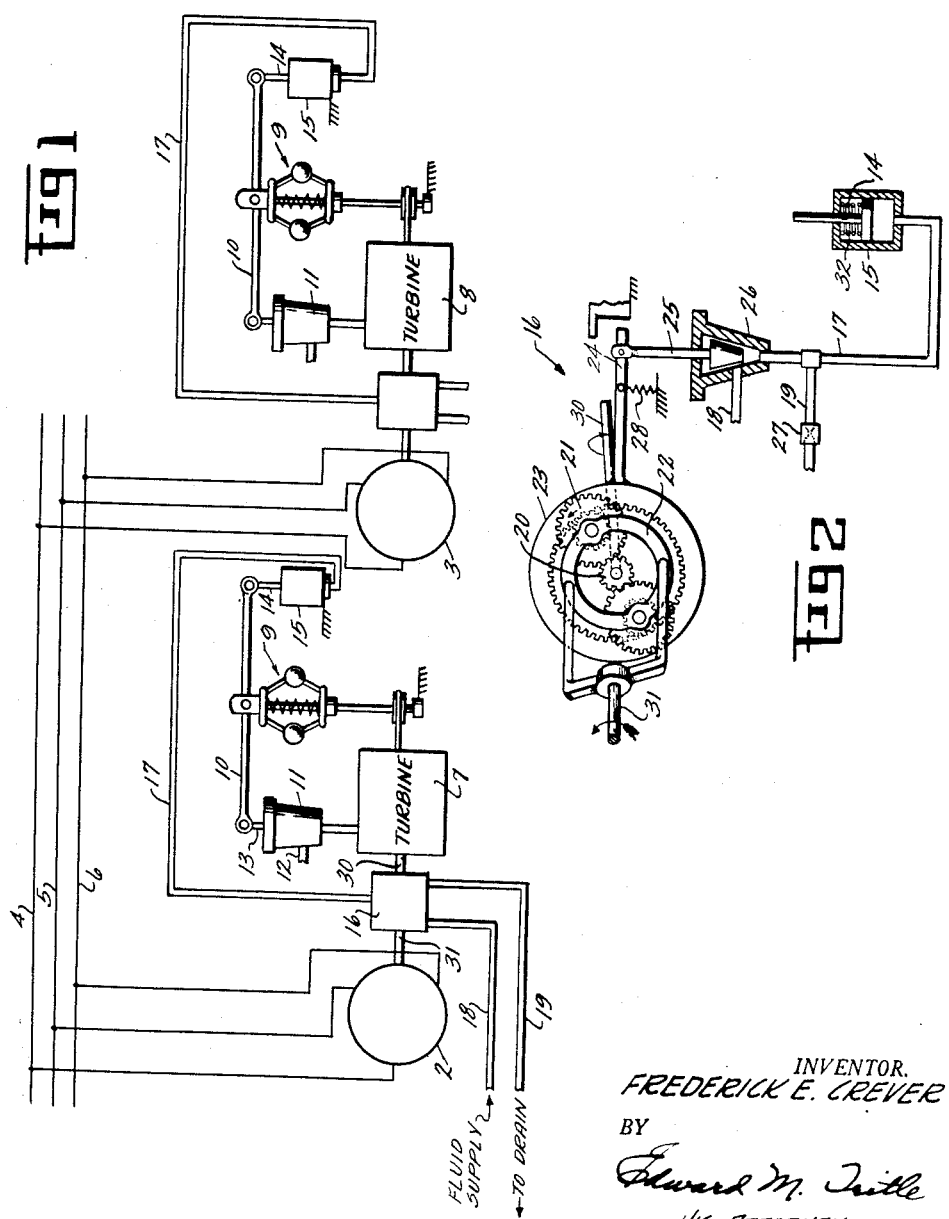
INVENTOR.
FREDERICK E. CREVER
BY
Edward M. Tuttle
HIS ATTORNEY United States Patent Office 2,783,391
Patented Feb. 26, 1957

2,783,391

LOAD DIVISION CONTROL FOR PRIME MOVERS

Frederick Emanuel Crever, Scotia, N. Y., assignor to General Electric Company, a corporation of New York Application May 3, 1955, Serial No. 505,631

3 Claims. (Cl. 290—4)

This invention relates to control apparatus for prime movers and more particularly to a control for maintaining a desired load division among a plurality of prime movers. The invention is herein illustratively described by reference to a three-phase system of two parallel connected turbine driven alternators intended for aircraft use wherein the alternators are of equal size or capacity. It will be noted, however, that the control apparatus and principles involved may be applied equally as well to prime movers other than turbines and load devices other than alternators of any number. When driving two or more alternators independently which supply electrical energy to a common distribution system, it is desirable to have the alternators share the load equally in order to prevent overloading of any one machine or portion of the circuit. Load division is generally accomplished by controlling the speed of the individual alternators since the speed-load characteristic of each prime mover relative to that of the others determines load division. It has been common practice with turbine movers to provide a speed governor which regulates a valve in a conduit which provides motive fluid to the turbine. The governor is made load sensitive by feeding back valve position to the governor so that there is a fixed relationship between the speed held by the governor and the position of the valve that the governor operates. Provided there is a fixed relationship between valve position and the desired speed-load characteristic, load division can be obtained in this way. In certain applications, however, and particularly in aircraft applications where air turbines are used as the prime movers, the supply of motive fluid to the turbines varies both in temperature and in pressure so that the relationship between the governor actuated valve position and the turbine output power at a given speed is variable. Thus, the commonly used scheme described above cannot be used to obtain the proper load division when the supply of motor fluid to each of the units varies or is different either in pressure or temperature or both. Accordingly, an object of the invention is to provide an improved load division control for prime movers which control acts independently of the conditions of the energy supply for the prime mover.

Another object is to provide a control that will maintain a predetermined load division between a plurality of prime movers which is lightweight, simple, and reliable, making it particularly suitable for aircraft use.

Briefly, these and other objects are obtained by providing a torque sensor which senses the torque delivered by the prime mover and feeding a signal proportional to the sensed torque back to the speed governor. Thus a predetermined speed-load characteristic is established and the governor speed setting is independent of valve position.

The invention will be better understood from the following description taken in connection with the accompanying drawing in which Fig. 1 is a diagrammatic view of a load division control in accordance with the invention; and Fig. 2 is a diagrammatic representation of a preferred form of torque sensor that may be used in practicing the invention.

Referring to Fig. 1, a plurality of alternators 2 and 3 are connected in parallel to supply electrical energy to conductors 4, 5, and 6. The alternators 2 and 3 are driven by prime movers, such as turbines 7 and 8 respectively, the speed of each prime mover being controlled by a governor mechanism 9 that controls a valve 11 through a lever 10. The valve 11 is connected in a fluid conduit 12 and controls the supply of motive fluid therethrough to the turbines 7 and 8. The lever 10 is connected pivotably at a point between its ends to the governor mechanism 9, at one end to a control stem 13 of the valve 11, and at the opposite end to an output shaft 14 of a fluid piston actuator 15 which is biased downwardly by a spring 32 as shown in Fig. 2. Referring again to Fig. 1, a torque sensor 16 between each prime mover and its load is arranged to sense the torque transmitted therebetween and vary the pressure of the fluid supplied to the actuator 15 through a fluid conduit 17 in proportion to the torque sensed.

A preferred form of torque sensor which may be used for that illustrated generally at 16 in Fig. 1 is shown in more detail in Fig. 2.

Referring to Fig. 2, a conventional planetary gear arrangement is shown comprising a sun gear 20, four planet gears 21 which ride in a cage 22 and a ring gear 23. The turbine shaft 30 is connected to drive the sun gear 20 and the cage is connected to drive the alternator shaft 31. The ring gear is mounted for limited rotation and has an arm 24 attached thereto which is connected at its outer end to the control stem 25 of a fluid valve 26. A spring 28 biases the arm 24 downwardly to close the valve 26. When a torque is transmitted from the turbine to generator through the planetary gear system, a torque proportional to that being transmitted will be transmitted to the ring gear 23. Assuming the direction of rotation to be as indicated by the arrows in Fig. 2, when a torque is transmitted from the turbine to the generator the ring gear 23 will rotate counterclockwise against the biasing force of the spring 28. Hence the opening of the valve 26 will be proportional to the torque being transmitted from the turbine to the alternator. Pressurized fluid is supplied to the valve 26 through a conduit 18 and returned to a drain through a conduit 19. A restriction 27 is provided in the fluid return conduit 19 so that the pressure of the fluid supplied to the piston actuator 15 through the conduit 17 is proportional to the opening of the valve 26. Thus the effect of the arrangement shown in Fig. 2 is to provide a fluid pressure to the piston actuator 15 which is proportional to the torque being transmitted from the prime mover 7 or 8 to the alternator 2 or 3 respectively.

With the arrangement thus described, the operation is as follows. Assume any given electrical load on the electrical conductors 4, 5, and 6, and that the turbines 7 and 8 are running at the same speed and the alternators 2 and 3 are each supplying exactly one-half of the electrical energy required by the load. Now assume that the electrical load to be supplied from the generators 2 and 3 is increased. As the energy required from the alternators 2 and 3 increases, their speed will start to decrease as long as additional motive fluid is not supplied to the turbines 7 and 8 through the valves 11. As the speed of the turbines begins to drop, the speed governors 9 will move the levers 10 upward to open the valves 11 further thereby resulting in an increased flow of motive fluid to the turbines. As more motive fluid flows through the conduit 12 and valve 11 to the turbines 7 and 8, the torque transmitted to the alternators 2 and 3 through the torque sensors increases so that a fluid pressure signal is conducted through the conduit 17 to the piston actuator 15. Increasing fluid pressures through the conduit 17 to the piston actuator 15 will cause an upward movement of the output shaft 14 thus causing the valve 11 to tend to close. Thus a predetermined torque-speed characteristic is obtained for each turbine whereby the torque sensor 16 and piston actuator 15 act on the speed governor system so that the speed maintained by the governor decreases with increasing torque sensed by the torque sensor. This type of characteristic is commonly referred to as a "droop" characteristic. Provided that the speed-torque characteristic of each turbine alternator combination is exactly similar, the decrease in steady-state operating speed from zero to full torque output need be infinitesimal to provide exactly equal load division between the units. It will be apparent to those skilled in the art, however, that the speed-torque characteristics of two or more turbine-alternator combinations can never be exactly equal and that when they are not equal, the greater the decrease in speed for a given increase in torque the more nearly equal the load division will be. The exact percent of "droop" which is defined as the ratio of decrease in speed from no-load to full-load over the no-load value of speed is to be determined by the requirements of the given installation. As increasing "droop" results in increasing frequency regulation as the quality of load division is obtained the percent of "droop" to be used in a given application will necessarily be a compromise between these two conflicting considerations.

Thus it will be seen that the system thus described provides load division regulation between prime movers that may have varying levels of energy input without the requirement of interconnecting the prime movers except as the load devices are interconnected in supplying a common load.

While a particular embodiment of the invention has been shown and described, it will be obvious to those skilled in the art that various changes and modifications may be made therein without departing from the spirit and scope thereof and it is intended to cover herein all such changes and modifications that come within the true scope and spirit of the invention.

What I claim as new and desire to secure by Letters Patent of the United States is:

1. Load division control means for a plurality of independently driven alternators comprising means for sensing a speed proportional to the speed of each alternator separately, means for sensing a torque proportional to the torque delivered to each alternator separately, and means responsive to said speed and torque sensing means to control the speed of each alternator so as to maintain a predetermined inverse relationship between its speed and the torque delivered to it.

2. Load division control means for a plurality of alternators each driven by a separate prime mover, comprising means for sensing a speed proportional to the speed of each prime mover, means for sensing a torque proportional to the output torque of each prime mover, and means responsive to said speed and torque sensing means to control the supply of energy to each prime mover so as to maintain essentially the same predetermined relationship between speed and torque for each prime mover and alternator combination.

3. In a load division control for a plurality of alternators each of which is driven by a separate turbine, the combination for each turbine-alternator unit of means for sensing speed proportional to the speed of said unit, means for sensing a torque proportional to the torque delivered from the turbine to the alternator, means for controlling the flow of motive fluid to said turbine, means responsive to said speed and torque sensing means to actuate said flow control means to maintain a predetermined inverse relationship between said torque and said speed.

References Cited in the file of this patent

UNITED STATES PATENTS

| Number | Name | Date |
|---|---|---|
| 1,655,469 | MacMillan | Jan. 10, 1928 |
| 2,366,968 | Kaufmann | Jan. 9, 1945 |
| 2,374,276 | French | Apr. 24, 1945 |
| 2,391,323 | Martin | Dec. 18, 1945 |
| 2,560,914 | Almeras | July 17, 1951 |
| 2,566,694 | Chillson | Sept. 4, 1951 |
| 2,600,612 | Bollo | June 17, 1952 |
| 2,667,228 | Wood et al. | Jan. 26, 1954 |
| 2,772,926 | Bradnick | Nov. 8, 1955 |